US007898401B2

(12) United States Patent
Caspe-Detzer et al.

(10) Patent No.: US 7,898,401 B2
(45) Date of Patent: Mar. 1, 2011

(54) VEHICLE COUNTDOWN TIMER AND USER INTERFACE

(75) Inventors: Martin Jay Caspe-Detzer, Fall City, WA (US); Andrew Joseph Ressa, Kirkland, WA (US); Phu Vi Tran, Renton, WA (US); Ian David O'Connor, Seattle, WA (US); John William Espinosa, Aubrey, TX (US); Paul Stephen Crowe, Aubrey, TX (US)

(73) Assignee: PACCAR Inc, Bellevue, WA (US)

( * ) Notice: Subject to any disclaimer, the term of this patent is extended or adjusted under 35 U.S.C. 154(b) by 273 days.

(21) Appl. No.: 11/752,885

(22) Filed: May 23, 2007

(65) Prior Publication Data

US 2008/0291001 A1 Nov. 27, 2008

(51) Int. Cl.

| | |
|---|---|
| ***B60Q 1/00*** | (2006.01) |
| ***G09F 9/00*** | (2006.01) |
| ***G08B 1/00*** | (2006.01) |
| ***G04F 8/00*** | (2006.01) |
| ***F02N 11/08*** | (2006.01) |

(52) U.S. Cl. ....................... 340/438; 340/461; 340/462; 340/309.9; 368/5; 123/179.4

(58) Field of Classification Search ............. 340/457.4, 340/461, 462, 309.7, 309.9, 438; 700/306; 702/176, 177; 368/5, 6; 701/112; 123/179.4
See application file for complete search history.

(56) References Cited

U.S. PATENT DOCUMENTS

| | | | | |
|---|---|---|---|---|
| 1,442,312 | A * | 1/1923 | Watson | 123/198 B |
| 4,296,334 | A * | 10/1981 | Wong | 290/37 R |
| 5,219,413 | A * | 6/1993 | Lineberger | 180/272 |
| 5,222,469 | A * | 6/1993 | Sutton | 123/198 DC |
| 5,317,998 | A * | 6/1994 | Hanson et al. | 123/179.4 |
| 5,815,072 | A * | 9/1998 | Yamanaka et al. | 340/461 |
| 5,971,598 | A * | 10/1999 | Baba et al. | 700/296 |
| 2005/0230175 | A1 * | 10/2005 | Brown et al. | 180/272 |

* cited by examiner

*Primary Examiner*—Daniel Wu
*Assistant Examiner*—Mark Rushing
(74) *Attorney, Agent, or Firm*—Christensen O'Connor Johnson Kindness PLLC

(57) ABSTRACT

Aspects of the present invention are directed at allowing a vehicle to idle for a predetermined amount of time before shutdown. In accordance with one embodiment, a method is provided that accepts input from the vehicle operator to initiate a countdown to vehicle shutdown. When the input is received, a countdown is initiated that is regularly updated to reflect the passage of time. During the countdown, a vehicle ignition bus is maintained in an active state and a countdown value that reflects the time remaining before shutdown is presented on a graphical display. Then, in response to expiration of the countdown, the method allows the vehicle ignition bus to transition into an inactive state.

20 Claims, 3 Drawing Sheets

VEHICLE COUNTDOWN TIMER AND USER INTERFACE

FIELD OF THE INVENTION

The present invention relates to systems and interfaces for managing the shutdown of a vehicle.

BACKGROUND

Vehicles such as long-haul trucks, cars, and boats are equipped with components that consume electrical power. By way of example only, components in a vehicle that consume electrical power typically include, but are not limited to, heating and air conditioning, interior/exterior lighting, digital consoles, and appliances such as refrigerators, coffee makers, and microwave ovens, as well as television and entertainment systems. A vehicle's engine may be maintained in a running but idle state when electrical power is needed. In this regard, those skilled in the art and others will recognize that when an engine is idling, a regular supply of electrical power is available. However, maintaining a vehicle's engine at idle for an extended period of time may result in undesired fuel consumption, engine wear, and excess emission of pollutants.

In conventional systems, mechanical ignition-bus timers allow a vehicle's engine to idle for a predetermined period of time before shutdown is initiated. As the mechanical ignition-bus timer counts down, electrical power is available to devices that consume power. Typically, mechanical ignition-bus timers override other vehicle systems to prevent shutdown. For example, even though a key-based ignition system indicates the vehicle is "off," the mechanical ignition-bus timer keeps an engine idling until the timer expires.

Unfortunately, these types of conventional systems lack features that would be beneficial to vehicle operators. For example, conventional systems lack a readily understandable user interface for presenting information about the time remaining before vehicle shutdown. As a result, a vehicle operator may not know when electrical power will not be available to power consuming devices.

Another type of conventional system for keeping a vehicle's engine in an idle state allows a fleet manager to remotely access an engine control system and set a countdown timer. In this instance, a vehicle operator may use an onboard communication system to contact a remote site associated with the fleet manager. The communication system allows the vehicle operator to request that the vehicle's engine remain in an idle state for a predetermined amount of time. In response, a device at the fixed location transmits data over a wireless communication channel to an engine control system. Based on the incoming data, the engine control system initiates a countdown timer. A drawback to this conventional system is that the countdown timer is set and/or modified at the remote location and a vehicle operator is not able to independently set and/or modify the countdown timer without contacting the remote location. Unfortunately, a communication channel may not always be established between a vehicle and the fixed site associated with the fleet manager.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Aspects of the present invention are directed at allowing a vehicle to idle for a predetermined amount of time before shutdown. In accordance with one embodiment, a method is provided that accepts input from the vehicle operator to initiate a countdown to vehicle shutdown. When the input is received, a countdown is initiated that is regularly updated to reflect the passage of time. During the countdown, a vehicle ignition bus is maintained in an active state and a countdown value that requests the time remaining before shutdown is presented on a graphical display. Then, in response to expiration of the countdown, the method allows the vehicle ignition bus to transition into an inactive state.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Prior to discussing the details of the invention, it should be understood that the following description is presented largely in terms of logic and operations that may be performed by electronic components. These electronic components, which may be grouped in a single location or distributed over a wide area, generally include processors, memory storage devices, display devices, input devices, etc. In circumstances where the electronic components are distributed, the components are accessible to each other via communication links. In the following description, numerous specific details are set forth in order to provide a thorough understanding of the invention. It will be apparent, to one skilled in the art, however, that the invention may be practiced without some or all of these specific details. In other instances, well-known process steps have not been described in detail in order not to unnecessarily obscure the invention.

Figure 1:
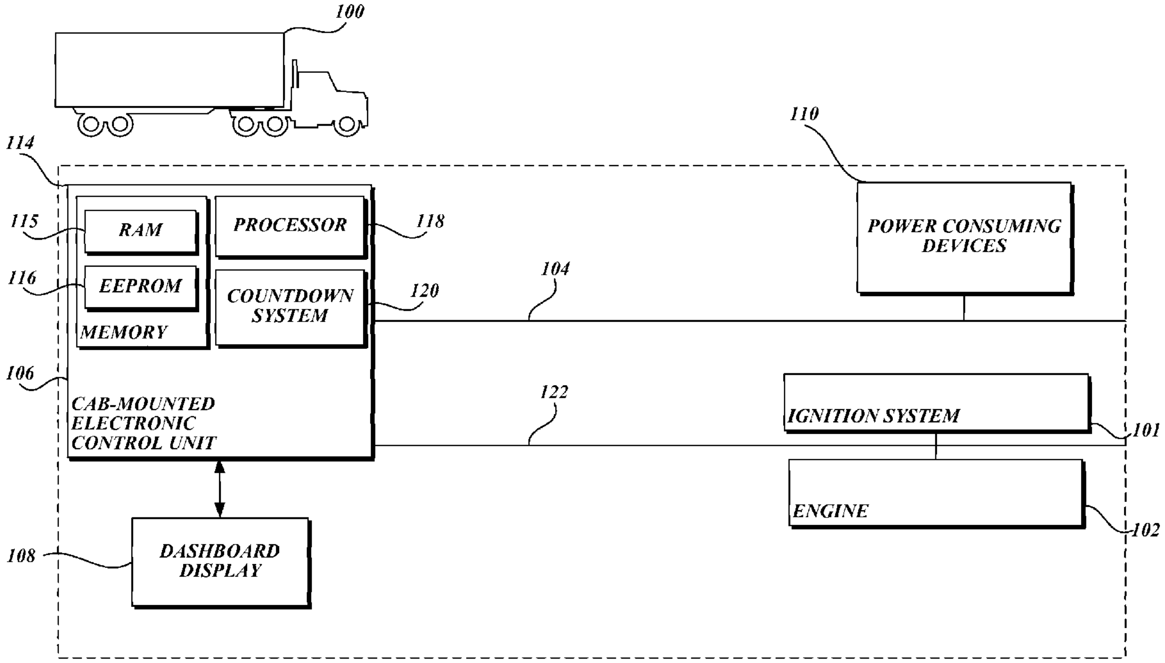
FIG. 1 is a pictorial depiction of an exemplary system with components that may be used to implement aspects of the present invention.

FIG. 1 and the following discussion is intended to provide a brief, general description of a system architecture in a truck 100 for implementing aspects of the present invention. In the example depicted in FIG. 1, the truck 100 includes an ignition system 101 associated with an engine 102, an ignition-bus 104, a cab-mounted electronic control unit 106 that is associated with a dashboard display 108, and a set of power consuming devices 110. While FIG. 1 depicts a truck 100, another type of vehicle such as a car, boat, or Recreational Vehicle ("RV") may be used to implement aspects of the present invention. One of ordinary skill in the art will appreciate that the system architecture of the truck 100 will include many more components than those depicted in FIG. 1. However, it is not necessary that all of these generally conventional components be shown or described in order to disclose an illustrative embodiment for practicing the present invention.

As further illustrated in FIG. 1, the ignition-bus 104 connects the electronic control unit 106 with the power consuming devices 110. In one embodiment, the ignition bus 104 produces an ignition signal in the form of a voltage change at vehicle start-up. For example, when a vehicle operator uses a key-based device to place a vehicle in run-mode, this input is identified by the electronic control unit 106. Then, the ignition signal is transmitted over the ignition-bus 104 to activate the set of power consuming devices 110. In this regard and by way of example only, the set of power consuming devices 110 may include, but are not limited to, interior/exterior lighting, heating/cooling systems, ventilation systems, and the like. Ignition of the engine 102 also occurs concurrently with the change in state of the ignition bus 104.

In the illustrative embodiment depicted in FIG. 1, the truck 100 includes a cab-mounted electronic control unit 106 that includes a memory 114 with a random access memory ("RAM") 115 and an electronically erasable, programmable, read-only memory ("EEPROM") 116, a processor 118, and a countdown system 120. Those skilled in the art and others will recognize that the EEPROM 116 is a nonvolatile memory capable of storing data when a vehicle is not operating. Conversely, the RAM 115 is a volatile form of memory for storing program instructions that are immediately accessible by the processor 118. Typically, a fetch-and-execute cycle in which executable instructions are sequentially "fetched" from the RAM 115 and executed by the processor 118 is performed. In this regard, the processor 118 is configured to operate in accordance with executable instructions that are sequentially fetched from the RAM 115.

Aspects of the present invention may be implemented in the countdown system 120 that is provided in the cab-mounted electronic control unit 106. In this regard, data may be loaded from the EEPROM 116 into the RAM 115 so that functionality provided by the countdown system 120 may be implemented. In one embodiment, the countdown system 120 allows the vehicle operator to set a timer so that power will be available to the set of power consuming devices 110 for a period of time before shutdown. Power will be available without the vehicle operator being required to provide additional input to shut down the power consuming devices 110. From an interface provided by the countdown system 120, the vehicle operator may dynamically modify the time that power is available by incrementing/decrementing the countdown value or resetting the countdown value altogether.

As will be appreciated by those skilled in the art and others, FIG. 1 provides a simplified example of one system architecture for implementing the present invention. In other embodiments, the functions and features of the truck 100 may be implemented using other components. For example, while FIG. 1 depicts an electronic control unit 106 that uses an EEPROM 116 for nonvolatile memory storage, those skilled in the art and others will recognize that other types of memory may be used. Thus, FIG. 1 depicts one component architecture for practicing the present invention. However, those skilled in the art and others will recognize that other component architectures may be used without departing from the scope of the claimed subject matter.

Now, with reference to FIGS. 2A-2C, a representative section of dashboard display 200 that illustrates aspects of the present invention will be described. In accordance with one embodiment, the dashboard display 200 includes graphical elements for presenting a countdown value to a vehicle operator. As described previously, a countdown performed by the present invention may be initiated when the vehicle operator wants power to be available to power consuming devices for a period of time before shutdown. From the dashboard display 200, the vehicle operator may access the current countdown value in various formats. Moreover, using the information presented on the graphical display 200, the vehicle operator may provide input to modify the time remaining before shutdown.

Figure 2A:
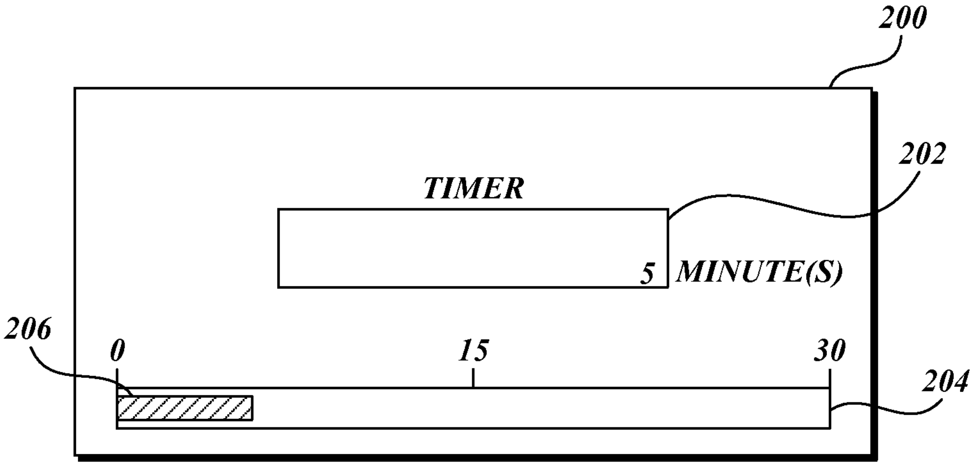
FIGS. 2A-2C are exemplary graphical displays that present information to a vehicle operator in accordance with one embodiment of the present invention.

For illustrative purposes, FIG. 2A depicts an exemplary graphical display 200 that presents a countdown value to a vehicle operator. In this exemplary embodiment, the graphical display 200 includes a numerical representation 202 of the current countdown value (e.g., "5 MINUTE(S)") that remains before power is no longer available. Also, a bar graph 204 is presented that graphically depicts the current countdown value on a slider 206. Accordingly, the slider 206 provides a representation of the numerical representation 202 relative to indicators on the bar graph 204. Moreover, the slider 206 moves along the bar graph 204 to provide dynamic visual updates to reflect changes to the countdown value.

Changes to the countdown value may be made by activating controls provided by the present invention. For example, a vehicle operator may activate an "INCREMENT" button for the purpose of increasing the countdown value by a specified unit of time (e.g., "1 MINUTE"). Also, a vehicle operator may activate a "DECREMENT" button for the purpose of decreasing the countdown value. Alternatively, a vehicle operator may use a keypad entry system to input a number that will replace the current countdown value.

Figure 2B:
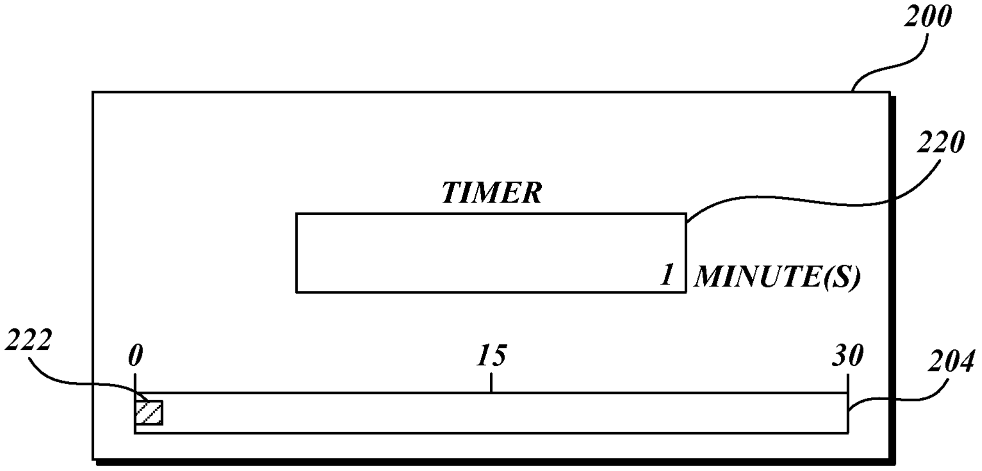

FIG. 2B includes the same graphical display 200 that was described above with reference to FIG. 2A. In this instance, the numerical representation 220 and slider 222 indicate that the current countdown value equals "1 MINUTE(S)." In one embodiment, an additional visual indicator is provided when the current countdown value is close to expiring. For example, when the countdown value reaches "1 MINUTE(S)," information presented on the graphical display 200 may change color from a normal color (e.g., green) to a different color (e.g., yellow). This change provides a readily understandable visual indicator that electrical power will not be available shortly.

Figure 2C:
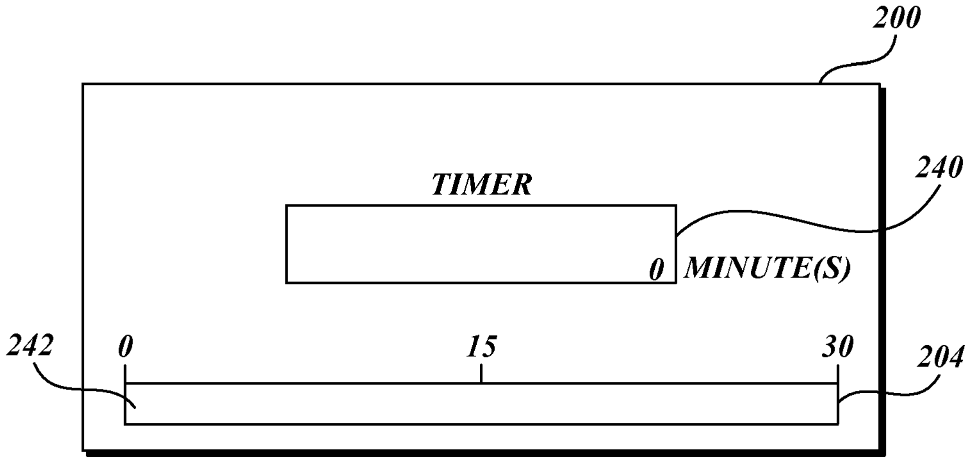

FIG. 2C includes the same graphical display 200 that was described above with reference to FIGS. 2A-2B. In this instance, the numeric representation 240 and the slider 242 indicate that the countdown timer has expired. Similar to the description provided above with reference to FIG. 2B, additional visual information may be provided to indicate that the countdown timer has expired. For example, when the countdown value reaches "0 MINUTE(S)," information presented on the graphical display 200 may change from a color that indicates shutdown is close (e.g., yellow) to a color that indicates shutdown has occurred (e.g., red). This change provides a readily understandable visual indicator that describes the state of the vehicle.

While a specific example of an exemplary graphical display 200 has been described above with reference to FIGS. 2A-2C, those skilled in the art and others will recognize that the features provided by the present invention may be implemented using a different type of interface. For example, the display 200 does not have to be graphically based, but may be rendered as a text display without graphical components. Thus, the examples provided above should be construed as exemplary and not limiting.

Now, with reference to FIG. 3, a flow diagram that depicts an exemplary embodiment of a countdown method 300 formed in accordance with the present invention will be described. In one embodiment, the countdown method 300 is responsible for identifying when a vehicle operator has activated a control to initiate a countdown. Once activated, processing is performed to maintain a countdown value that represents the time remaining until power is no longer available to power consuming devices. As described above with reference to FIGS. 2A-C, the countdown value is displayed on an interface to a vehicle operator. In this regard, the countdown method 300 may obtain and handle input that is directed at modifying the current countdown value.

Figure 3:
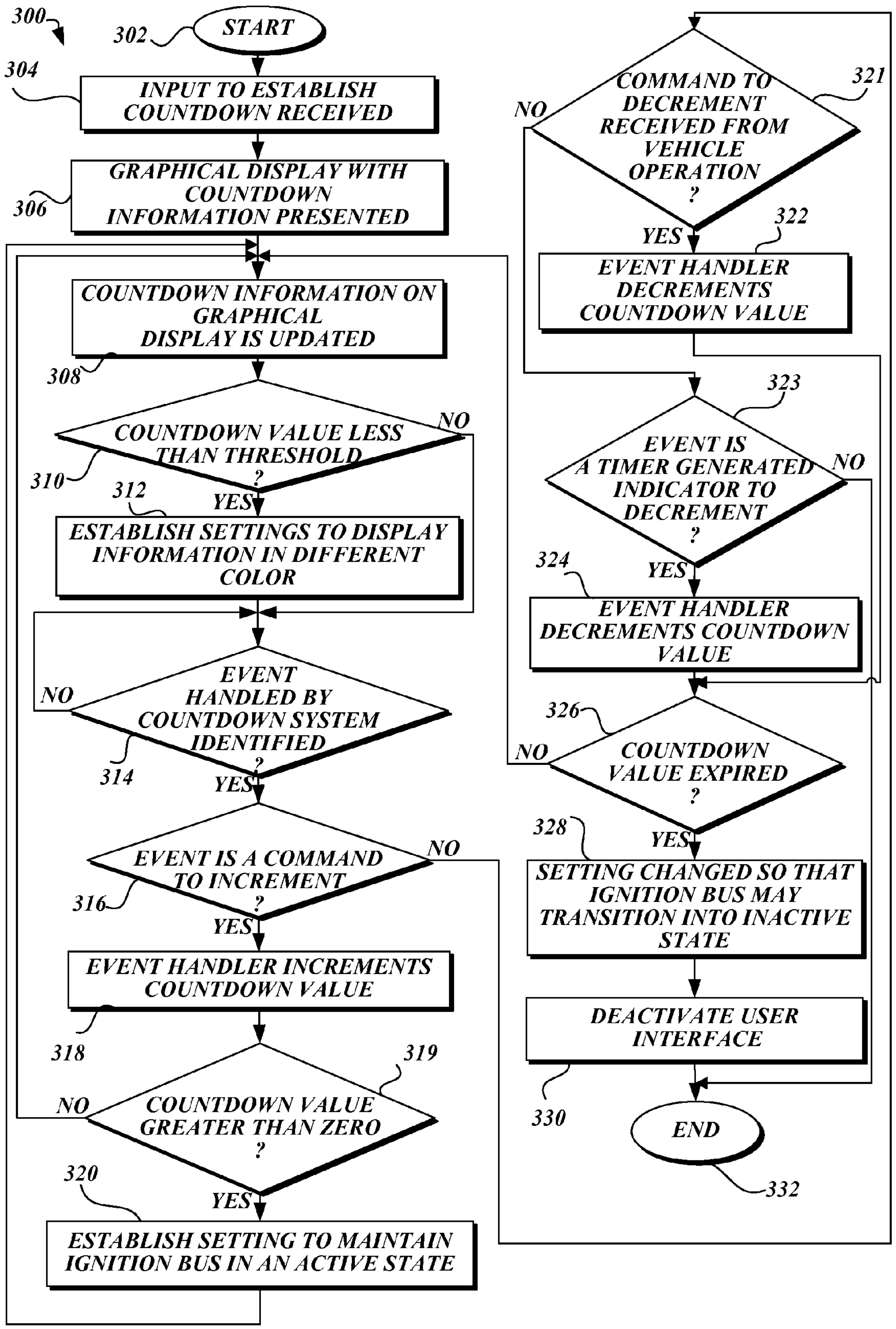
FIG. 3 is an exemplary flow diagram for processing countdown data in accordance with another embodiment of the present invention.

As illustrated in FIG. 3, the countdown method 300 begins at block 302, and at block 304, input is received from a vehicle operator to establish a countdown. In one embodiment, a vehicle operator may activate a hardware-based control to establish a countdown that will initiate shutdown of the vehicle. For example, a vehicle operator may activate a button on the dashboard display 108 (FIG. 1) in order to set the countdown. However, those skilled in the art and others will recognize that input to set the countdown may be received using other types of controls without departing from the scope of the claimed subject matter.

As further illustrated in FIG. 3, the countdown method 300 presents a graphical display 200 (FIGS. 2A-C) to a vehicle operator, at block 306. As described above, the graphical display 200 presents a countdown value that represents the time remaining before power is no longer available in both a numeric and graphical form. Moreover, using information presented on the graphical display 200, the vehicle operator may activate controls to modify the countdown value that is provided by default. In one embodiment, the countdown value is initially set to a default value, such as "30 MINUTE(S)." However, a vehicle operator may provide input to modify the default value by, for example, activating controls to increment/decrement the countdown value.

At block 308, the countdown value presented on the graphical display 200 is updated. Aspects of the present invention maintain a countdown value that represents the time remaining before vehicle shutdown. In this regard, the countdown value changes at regular intervals to reflect the passage of time. As described previously with reference to FIGS. 2A-C, the current countdown value is presented on the graphical display 200 to a vehicle operator. In one embodiment, a "refresh" operation is performed to update information presented on the graphical display 200 so that the most current countdown value is displayed. This refresh operation will update both the numeric and graphical representation of the countdown value.

At decision block 310, a test is performed to determine whether the current countdown value is equal or less than a predetermined threshold. As described above with reference to FIGS. 2A-2C, an easily understood visual indicator may be provided when the current countdown value is close to expiring. For example, data may be presented on a graphical display in a different color than normal when the countdown value is below a predetermined threshold (e.g., "1 MINUTE(S)"). This allows a vehicle operator to readily identify whether the power consuming devices are close to shutdown. However, those skilled in the art will recognize that a different threshold value may be applied without departing from the scope of the claimed subject matter. In any event, if a determination is made that the current countdown value is more than the predetermined threshold than the countdown method 300 proceeds to block 314, described in further detail below. Conversely, if the countdown value is less than the predetermined threshold, than the countdown method 300 proceeds to block 312. At block 312, settings are established so that information is presented on a graphical display in a different color than is normal (e.g., yellow). As mentioned previously, by providing this type of indicator, a vehicle operator may readily identify whether the countdown timer is close to expiring. Then, the countdown method 300 proceeds to block 314.

At decision block 314, the countdown method 300 remains idle until an event that is handled by the countdown system 120 (FIG. 1) is identified. In this regard and by way of example only, events that may be handled by the countdown system 120 include requests to decrement/increment the current countdown value, cancel the countdown to shutdown, set a new countdown value, and a natural decrement that reflects the passage of time. As described in further detail below, the countdown method 300 depicted in FIG. 3 illustrates a scenario in which illustrative types of events are received. However, once an event that is handled by aspects of the present information is identified, the countdown method 300 proceeds to block 316.

At decision block 316, a determination is made regarding whether the event identified at block 314 was a command to increment the countdown value. In one embodiment, the countdown value is automatically incremented to a default value of thirty (30) minutes when the graphical display is initially presented. Also, aspects of the present invention allow a vehicle operator to activate a control, such as a button, in order to increment the countdown value in one (1) minute intervals. When this type of control is activated, existing systems notify the countdown method 300 of the activation. Accordingly, if the event identified at block 314 was not a command to increment the countdown value, the method 300 proceeds to block 321, described in further detail below. Conversely, if the event is directed at incrementing the countdown value, the countdown method 300 proceeds to block 318. Then, at block 318, the countdown method 300 executes an event handler to increment the countdown value based on the input that was received.

At decision block 319, a test is performed to determine whether the current countdown value is greater than zero. If a determination is made that that the results of the test performed at block 319 is "NO," the countdown method 300 proceeds back to block 308. Conversely, if the countdown value is greater than zero, then the countdown method 300 proceeds to block 320.

At block 320, settings are established to maintain a vehicle's ignition-bus in an "active" state. As mentioned previously, an ignition-bus may generate signals so that power is available to a vehicle's power consuming devices, when appropriate. More specifically, when the ignition bus is in an active state, power will be available to the power consuming devices. In contrast, if the ignition bus is placed in the inactive state, electrical power is not available to the power consuming devices. When block 320 is reached, a determination was made that time remains on the countdown timer. In this instance, settings are maintained that keep the ignition bus in an active state and power will be available to a vehicle's power consuming devices.

At decision block 321, a determination is made regarding whether the event identified at block 314 is a command to decrement the countdown value that was generated by a vehicle operator. As mentioned previously, the present invention provides controls that allow a vehicle operator to decrement the current countdown value. When this type of control is activated, the countdown method 300 is notified by existing systems when that input directed at decrementing the countdown value has been received. In this regard, if the event identified at block 314 was not a command to decrement the countdown value, the method 300 proceeds to block 323, described in further detail below. Conversely, if the event identified at block 314 is a command that is directed to decrementing the countdown value, the countdown method 300 proceeds to block 322. Then, at block 322, the countdown method 300 executes an event handler that decrements the countdown value based on the received input. In one embodiment, the countdown value may be decremented in one (1) minute intervals. However, a decrement to the countdown value may be implemented in other time intervals without departing from the scope of the claimed subject matter. Then, the countdown method 300 proceeds to block 326, described in further detail below.

As illustrated in FIG. 3, at decision block 323, a determination is made regarding whether the event identified at block 314 was a timer-generated command to decrement the countdown value. In accordance with one embodiment, aspects of the present invention maintain a timer that tracks the passage of time. Typically, the countdown value is decremented in units of one (1) second intervals when notified by the timer. At decision block 323 a determination is made regarding whether an indicator was received from a timer to decrement the countdown value. If the event identified at block 323 was not a timer generated decrement, then the countdown method 300 proceeds to block 332, where it terminates. Conversely, if the event was a timer-generated decrement to the countdown value, the countdown method 300 proceeds to block 324. Then, at block 324, the countdown method 300 executes an event handler that decrements the countdown value based input received from the timer. As mentioned previously and in accordance with one embodiment, the decrement performed at block 324 may be in a one (1) second interval.

At decision block 326, a test is performed to determine whether the countdown value that represents the time remaining before vehicle shutdown has expired. In other words, a test is performed to determine whether a decrement to the countdown value caused the value to reach "zero." If a determination is made that the countdown value did not expire, then the countdown method 300 proceeds back to block 308. In the event that the countdown expired, then the countdown method 300 proceeds to block 328.

At block 328, system settings are modified so that a vehicle's ignition-bus may proceed into an "inactive" state. If block 328 is reached, settings were established during a previous iteration of the countdown method 300 that prevent the vehicle's ignition-bus from proceeding into an inactive state. At block 328, these settings are changed so that the vehicle's ignition-bus will transition into an inactive state. Then, at block 330, the countdown method 300 deactivates the interface provided by aspects of the present invention and proceeds to block 332, where it terminates.

Generally stated, the countdown method 300 controls when power is available to a vehicle's power consuming devices. As a result of the ignition bus 104 being transitioned into the inactive state, at block 328, the vehicle's engine may also shut down. However, other systems may cause the vehicle's engine to shut down before the ignition bus 104 is transitioned into the inactive state, at block 328. To comply with government regulations, an engine may be configured with systems that control the maximum idle time for a vehicle's engine. For example, existing systems may cause a vehicle's engine to shut down after a predetermined period of time (e.g., 5 minutes) in order to comply with a government regulation. However, aspects of the present invention allow power consuming devices to be available even after a vehicle's engine has shut down. In this instance, the ignition bus 104 is maintained an inactive state, as electrical power being available to power consuming devices even though the engine is no longer idling.

While illustrative embodiments have been illustrated and described, it will be appreciated that various changes can be made therein without departing from the spirit and scope of the invention.

The embodiments of the invention in which an exclusive property or privilege is claimed are defined as follows:

1. In a vehicle that includes a display for presenting information to a vehicle operator, a method of providing a countdown to shutdown of power-consuming devices, the method comprising:

receiving input from the vehicle operator to initiate the countdown, wherein the input is a manually-activated hardware-based control to initiate the countdown, and wherein initiating the countdown allows a vehicle ignition system to transition to an inactive state while a vehicle ignition bus is in an active state;

maintaining a countdown value to reflect the passage of time, wherein the vehicle ignition bus is maintained in the active state before expiration of the countdown value;

presenting the current countdown value that reflects the time to shutdown of the power-consuming devices on a graphical display;

in response to expiration of the countdown, allowing the vehicle ignition bus to transition into an inactive state; and wherein the countdown value is modifiable both incrementally and decrementally in time, after initiation, by a user anytime prior to expiration of the countdown value without being required to actuate the vehicle ignition.

2. The method as recited in claim 1, wherein countdown information is presented on the graphical display in a first color when the countdown value is above a threshold value and in a color different from the first color once the countdown value intersects the threshold value.

3. The method as recited in claim 1, wherein maintaining the ignition bus in the active state before the countdown value expires includes overriding other vehicle systems that are capable of transitioning the ignition bus into an inactive state.

4. The method as recited in claim 1, wherein the countdown value is depicted in both a numeric and graphical form on the graphical display.

5. The method as recited in claim 1, wherein presenting the countdown value on the graphical display includes creating a bar chart with a slider that visually depicts the current countdown value.

6. The method as recited in claim 1, wherein a vehicle operator is not required to provide additional input to shut down the power-consuming devices when the countdown value expires.

7. The method as recited in claim 1, wherein maintaining a countdown value to reflect the passage of time includes receiving input from a vehicle operator to modify the countdown value and modifying the countdown value based on the input.

8. The method as recited in claim 7, wherein the countdown value is modified in one minute intervals.

9. An ignition-bus timer for managing activation of an ignition bus in a vehicle, comprising:

an interface operative to:

receive input from the vehicle operator to initiate a countdown, wherein the input is a manually-activated hardware-based control to initiate the countdown; and display a countdown value that reflects the time remaining until shutdown to power-consuming devices;

an electronic control unit coupled to the interface that is configured to:

maintain an ignition bus in an active state in response to receiving operator input to initiate a countdown to vehicle shutdown, while allowing a vehicle engine ignition system to transition to an inactive state;

maintain a countdown value in memory that reflects the time remaining before shutdown to the power-consuming devices, wherein the countdown value is modifiable both incrementally and decrementally in time, after initiation, by a user from the interface anytime prior to expiration of the countdown value without being required to actuate the vehicle ignition; and cause the ignition bus to transition into an inactive state in response to expiration of the countdown value, wherein the vehicle's engine may be shut down before the ignition bus transitions to an inactive state.

10. The ignition-bus timer as recited in claim 9, wherein to display a countdown value that reflects the time remaining until shutdown includes providing a visual indicator by changing the color of one or more graphical elements presented on the interface when the countdown value is close to expiring.

11. The ignition-bus timer as recited in claim 10, wherein one or more graphical elements are presented on the interface in a first color when the countdown value is above a threshold value and in a color different from the first color once the countdown value intersects the threshold value.

12. The ignition-bus timer as recited in claim 9, wherein to display a countdown value that reflects the time remaining until shutdown includes presenting the countdown value in both a numeric and graphical form on the interface.

13. The ignition-bus timer as recited in claim 9, wherein to maintain an ignition bus in an active state includes overriding other vehicle systems that are capable of transitioning the ignition bus into an inactive state.

14. The ignition-bus timer as recited in claim 9, wherein communications between the interface and electronic control unit do not utilize a wireless network.

15. The ignition-bus timer as recited in claim 9, wherein to maintain a countdown value in memory that reflects the time remaining before shutdown includes allowing the countdown value to be increased and decreased by one minute increments before expiration.

16. The ignition-bus timer as recited in claim 9, wherein to maintain a countdown value in memory that reflects the time remaining before shutdown includes decrementing the countdown value to reflect the passage of time.

17. A system for maintaining an ignition-bus timer in a vehicle, the system comprising:

an ignition bus for supplying signals to the vehicle's engine;

an interface for receiving operator input to initiate a countdown to shutdown of power-consuming devices, wherein the input is a manually-activated hardware-based control to initiate the countdown;

a display for displaying the countdown information; and an electronic control unit for:

causing the display to present the time remaining until the countdown expires;

maintaining the ignition bus in an active state before expiration of the countdown while allowing a vehicle engine ignition system to transition to an inactive state, wherein the countdown value is modifiable both incrementally and decrementally in time, after initiation, by the user anytime prior to the expiration of the countdown value without being required to actuate the vehicle ignition; and in response to expiration of the countdown, transitioning the ignition bus into an inactive state.

18. The system as recited in claim 17, wherein the electronic control unit is further configured to determine when the countdown value intersects a threshold value and wherein the interface is configured to present information on the display in a first color when the countdown value is above the threshold value and in a color different from the first color once countdown value intersects below the threshold value.

19. The system as recited in claim 17, wherein the interface is further configured to obtain operator input to modify the countdown value and wherein the electronic control unit is further configured to modify the countdown value in accordance with the operator input.

20. The system as recited in claim 17, wherein the interface for receiving operator input is integrated into the display for displaying the countdown.

* * * * *